Sept. 14, 1954  A. LUBINSKI  2,688,871
INSTANTANEOUS BIT RATE OF DRILLING METERS
Filed Jan. 3, 1949  3 Sheets-Sheet 2

INVENTOR

Sept. 14, 1954  A. LUBINSKI  2,688,871
INSTANTANEOUS BIT RATE OF DRILLING METERS
Filed Jan. 3, 1949  3 Sheets-Sheet 3

INVENTOR
Arthur Lubinski

Patented Sept. 14, 1954

2,688,871

UNITED STATES PATENT OFFICE 2,688,871

INSTANTANEOUS BIT RATE OF DRILLING METERS

Arthur Lubinski, Tulsa, Okla.

Application January 3, 1949, Serial No. 68,788

7 Claims. (Cl. 73—151.5)

The present invention relates to an improvement in instrumentation to be used in connection with drilling of oil wells. More particularly, it relates to an instrument for indicating the rate with which the drill bit progresses into the formation.

It is believed that no such instrument exists at present. The conventional rate of drilling instruments do not provide a measurement indicating the progress of the bit. They measure merely the progress of the downward motion of the upper extremity of the drill string commonly designated as kelly. However, the drilling string is continuously subjected to variation of length due to elastic deformations and, therefore, the motion of the kelly is not the same as the motion of the bit. In order to eliminate the errors due to the fact that no allowance was made for the elastic variations of the length of the drill pipe, the rate of drilling determination made in the prior art consisted in measurement of the average value of the drilling rate over an appreciable depth, such as two feet for instance.

The object of this invention consists in producing a permanent indication of the instantaneous bit rate of drilling similar to an automobile speedometer, i. e. determining at any moment the rate of downward motion of the bit itself.

The details of the invention can be understood from the appended specification and the enclosed drawings in which:

Fig. 4 is a modification of a rate indicating instrument of electrical type in which the use of derivator circuit such as shown in Fig. 2 has been eliminated.

Figure 1:
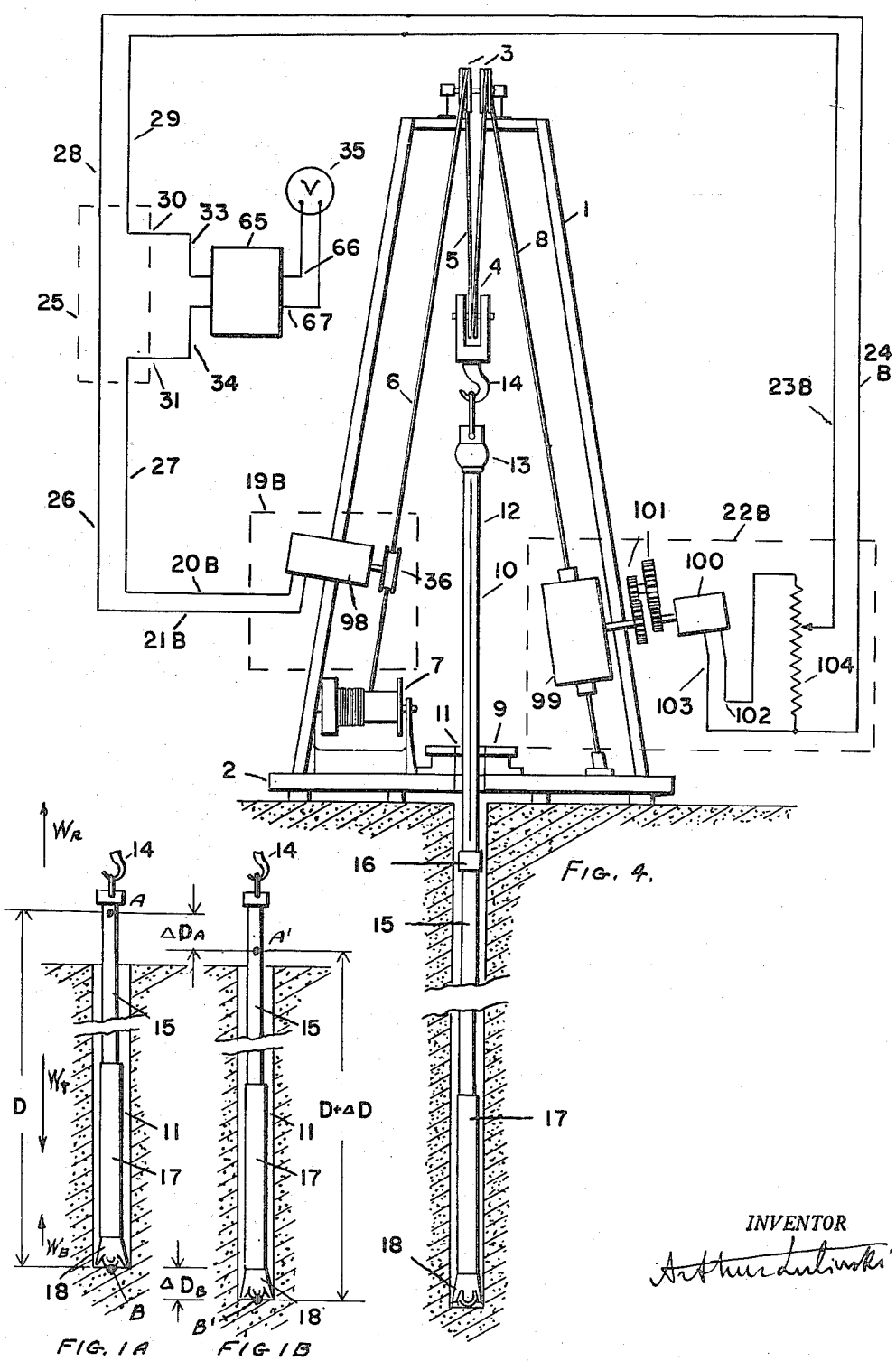
Fig. 1a and Fig. 1b show schematically certain factors affecting the operation of the proposed device at two succeeding times.

The principle of operation of the invention can be readily visualized from inspection of Figs. 1a, 1b showing, respectively, the positions of the drilling string at an instant $T_0$ and at a suitable later instant $T_0 + \Delta T$. In both figures the numeral 11 designates the bore hole in process of being drilled. The drill string comprises a drill pipe section 15 extending from the top of the bore downwards. A heavy and thick drill pipe 17 is fastened to the lower portion of the drill pipe and is provided at its lower end with the drill bit 18.

The drill string is subjected during the drilling process to variable tension and therefore its length varies. Of particular interest to the driller are two portions of the drill stem that are represented by points A and B. The point A is located on the top of the drill stem directly above the earth surface. The motion of the point A is directly observable by the driller and can be indicated by means of a suitable arrangement. The point B is located at the lower extremity of the drill string at the bottom of the bore hole. The distance between A and B designated by D represents the length of the drill stem and because of the elasticity of the drill pipe the length D usually undergoes variations caused by variation of corresponding forces.

The object of the invention consists in producing an indication of the rate of progress of the bit, and therefore I am particularly interested in determining the downward motion of the lower extremity of the drill represented by the point B. This point is, however, entirely inaccessible to direct observation, and the problem consists therefore in deriving from the motion of point A (directly observable) and from certain factors controlling the length of the drill string, the desired indication of the downward progress of the point B.

Consider now an instant $T_0 + \Delta T$ represented in Fig. 1b. The point A has moved downward to a position $A^1$ distant from A by the amount $\Delta D_A$, the point B has moved downward to the position $B^1$ distant from B by the amount $\Delta D_B$ and the new length of the drill string represented by the distance $A^1B^1$ has now increased to a value $D + \Delta D$. From the inspection of Figs. 1a and 1b it is seen that the following relation holds true:

$$AB + \Delta D_B = \Delta D_A + A'B' \quad (1)$$

or $$D + \Delta D_B = \Delta D_A + D + \Delta D \quad (2)$$

whence $$\Delta D_B = \Delta D_A + \Delta D \quad (3)$$

or $$\frac{\Delta D_B}{\Delta T} = \frac{\Delta D_A}{\Delta T} + \frac{\Delta D}{\Delta T} \quad (4)$$

It is desired to produce an indication of the value $\Delta D_B/\Delta T$ representing the rate of progress of the bit and it is seen that this value can be determined by separately producing signals representing values $\Delta D_A/\Delta T$ and $\Delta D/\Delta T$ and subsequently adding these signals.

The value $\Delta D_A/\Delta T$ represents the downward motion of the upper extremity of the drill stem and is represented by means of a suitable arrangement that shall be explained hereafter.

The signal $\Delta D/\Delta T$ representing the rate of change of the length of the drill pipe can be determined by means of the following considerations:

As stated above, the drilling string consists of a relatively thin pipe section 15 which is provided at the lower extremity by a thick pipe 17 designated as drill collars which in turn are fastened at their lower end to the drill bit 18.

It is apparent to those skilled in the art that the drill string is subjected to internal tensions (or compressions) that are not uniform throughout its length, but decrease with the depth. Thus, for instance, the upper portions of the drill string in the neighborhood of the point A are subjected to a tension substantially equal to the weight suspended from the hook 14. Let $W_R$ designate this weight. As I progress downward, the tension decreases and at a certain critical depth it becomes equal to zero. This critical depth is located below the drill pipe section somewhere within the drill collars section. The section located immediately below this depth is subjected to a small compression and this compression increases with the depth as I approach the point B at the bottom of the hole. At this depth the compression is equal to the weight on bit. Let $W_B$ designate this weight.

It is therefore apparent the longest portion of the drill string consists of the drill pipe 15 and is subjected only to tension which causes its elastic elongation. The relatively short section of the drill collars is subjected to compression, but the corresponding elastic deformation is negligible because the thick drill collars are practically not elastic.

We can therefore consider the overall picture by assuming that the total drill string is subjected to an elastic elongation, and consequently the corresponding variation $\Delta D$ in the length of the drill string can be represented as $$\Delta D = K \Delta W_R$$

where K is a constant (5)

$$\frac{\Delta D}{\Delta T} = K \frac{\Delta W_R}{\Delta T} \quad (6)$$

Consequently, the signal representing the rate of change in the length of the drill stem can be replaced by the signal representing the rate in change in the force $W_R$ multiplied by an appropriate coefficient.

Substituting (6) in (4) I obtain for the desired signal representing the rate of progress in the bit an expression as follows (in the limiting case for $\Delta T \to 0$):

$$\frac{dD_B}{dT} = \frac{dD_A}{dT} + K \frac{dW_R}{dT} \quad (7)$$

It is apparent from the expression (7) that in order to produce the desired indication $$\frac{dD_B}{dT}$$

representing the progress of the drill bit two separate indications are required; namely, the indication $$\frac{dD_A}{dT}$$

representing the progress of the upper extremity of the drill string and the indication $$K \frac{dW_R}{dT}$$

representing the rate of change of the weight. I may modify somewhat the problem and express the formula (8) as follows:

$$\frac{dD_B}{dT} = \frac{d}{dT}(D_A + KW_R) \quad (8)$$

Consequently, as expressed by the formula (8) the desired result may be obtained by separately producing a signal representing the value $D_A$ corresponding to the downward displacement of the upper extremity of the drill string, and separately producing another signal $W_R$ representing the weight suspended on the hook 14. These two signals are subsequently added to form a signal $(D_A + KW_R)$ and subsequently another signal is produced that represents the time derivative of the sum $(D_A + KW_R)$. This latter gives the desired indication representing the instantaneous rate of drilling.

Figures 2, 2A:
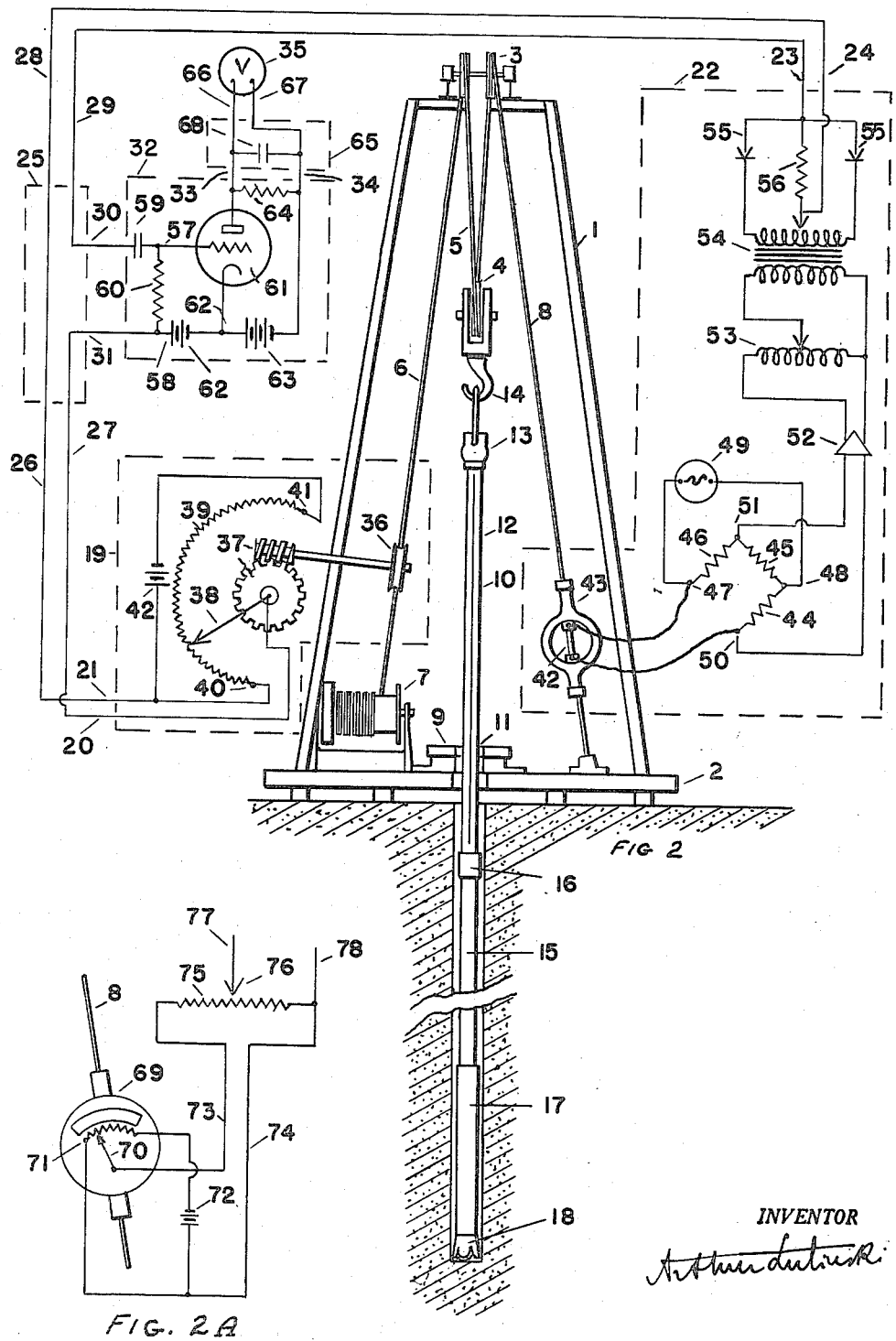
Fig. 2 shows the details of the rate indicating instrument in conjunction with conventional drilling equipment. The instrument is of the electrical type and comprises a derivator circuit as one of its elements.
Fig. 2a shows a modified weight responsive element which constitutes one of the elements of the arrangement of Fig. 2.

Consider now Fig. 2 representing a conventional rotary drilling rig. The principal portion of the arrangement shown consists of a derrick 1 mounted on a floor 2, crown block pulleys 3, from which a conventional traveling block 4 is suspended by means of the usual wire cables 5 terminating in the hoisting or drilling line 6. The drilling line is fed from the reel 7 by releasing a conventional brake, not shown. The movement of the hoisting or drilling line 6 about the crown pulleys 3 controls the raising and lowering of traveling block 4. The hoist line 6 after having passed about the crown block pulleys 3 and the traveling block pulley 5 terminates by the so-called dead line 8 which is anchored to the derrick. Mounted on the derrick floor is a conventional rotary table 9 through which the usual drilling string indicated at 10 extends into the well bore 11. Drilling string 10 consists of a rotary drive member or kelly 12 attached by a swivel 13 to a hook 14 suspended from traveling block 4, hollow drill pipe 15 connected by a coupling 16 to the kelly, a hollow thick drill collar section 17 and a drill bit 18 attached to the lower end of the drill collars.

The rate indicating instrument comprises the following essential elements:

(1) Means for producing a signal $D_A$ comprised within dotted rectangle 19. An electric voltage representing the value $D_A$ is thus produced across the output terminals 20 and 21.

(2) Means for producing a signal $KW_R$ comprised within the dotted line 22. An electric voltage representing the value $KW_R$ is thus produced across the output terminals 23 and 24.

(3) Means for adding the signals $D_A$ and $KW_R$ comprised within the dotted rectangle 25. This means is provided with two pairs of input terminals designated by numerals 26, 27 and 28, 29 and one pair of output terminals 30, 31. The input terminals are connected in a manner so as to produce across the output terminals 30 and 31 a voltage equal to the sum of the two input voltages. Since the input voltages applied across the terminals 26, 27 and 28, 29 are respectively $D_A$ and $KW_R$, then the resulting voltage across the output terminals 30, 31 represent $$D_A + KW_R$$

(4) Means comprised within the dotted rectangle 32 for producing the time derivation of the signal $D_A + KW_R$. The means is provided with one pair of input terminals 30, 31 across which a voltage representing the signal $$D_A + KW_R$$

is applied and one pair of output terminals 33 and 34 across which a voltage representing the signal $$\frac{d}{dT}(D_A + KW_R)$$

is produced.

(5) Means comprised within the dotted rectangle 65 for damping the fluctuations due to vibrations and other reasons which frequencies are of the same order of magnitude. The means is provided with one pair of input terminals 33, 34 and one pair of output terminals 66, 67.

(6) A suitable meter 35 measuring the voltage across the terminals 66 and 67. This meter is graduated in feet per hour and continuously indicates the instantaneous rate of penetration of the drilling bit into the formation.

The means (1), (2), (4), and (5) are described as follows:

(1) The means for producing the signal $D_A$ (within the dotted rectangle 19) comprises a pulley 36 driven by the hoist line 6 which in turn drives a worm gearing reduction 37 which moves the moving arm 38 of a potentiometer. The potentiometer comprises a semi-circular fixed resistor 39 having its terminals 40 and 41 supplied by a suitable battery 42. The arm 38 is provided at its extremity with a contact member adapted to slide upon the resistor in accordance with the motion of the gear. The output terminals 21 and 20 are respectively connected to the terminal 40 of the resistor and the moving arm 38. It is apparent that the output voltage across the terminals 21 and 20 represents in fact the potential drop in a portion of the resistor between the terminal 40 and the sliding contact of the moving arm 38 and, furthermore, this voltage is proportional to the total displacement of the hoist line which in turn is proportional to $D_A$.

(2) The means for producing a signal $KW_R$ (within the dotted line 22) comprises a strain responsive element 42. This element consists of a resistor having its two ends fastened by means of appropriately insulated terminals to a frame structure 43 which is in turn clamped to the dead line 8. The dead line is subjected to a tension which is proportional to $W_R$. This tension is transmitted to the frame structure 43 and to the strain responsive element 42 and causes a corresponding elongation of this element which in turn causes a corresponding change in the electric resistance of the element. Consequently, the resistance of the element 42 represents the tension $W_R$. The strain responsive element 42 is made to be one of the arms of a Wheatstone bridge, the remaining three arms of which consist of resistors 44, 45 and 46. The two terminals 47 and 48 of the bridge are supplied with an A.-C. voltage source 49 and the two other terminals 50 and 51 are connected to an amplifier 52, the output of which is in turn transmitted through the two transformers 53 and 54 to a two wave rectifier 55.

It is apparent that the A.-C. voltage across the terminals 50 and 51 of the Wheatstone bridge and applied to the rectifier 55 depends upon the resistance of the element 42 and, therefore, represents $W_R$.

The rectifier is of standard construction and comprises two rectifying elements 55 connected in a manner shown in the Fig. 2 to the resistor 56 and the secondary winding of the transformer 54. The transformer 53 is an auto-transformer of any commercial type such as the "Varitran" manufactured by General Electric. It produces a means of changing at will the ratio between the tension $W_R$ and the output voltage across the terminals 23 and 24, said output voltage representing the value $KW_R$. Thus a suitable value may be given to the coefficient K (see Formula 8) in accordance with the elasticity of the pipe. It is well known that the elasticity of the drill pipe depends upon the type of the pipe and its length. Consequently the values of K has to be changed from time to time as the drilling progresses.

(4) The means for producing the time derivative of the signal $D_A + KW_R$ (within the dotted rectangle 32) is adapted to perform the process of derivation electrically in such a manner that when it receives between its input terminals 30 and 31 a certain voltage it delivers across the leads 57 and 58 a voltage varying substantially as the derivative with respect to time of the input voltage. The derivator consists of a capacitor 59 inserted between the terminal 30 and the lead 57, and of the resistor 60 inserted between the terminal 31 and the lead 57.

The operation of the derivator can be explained mathematically as follows: Let $V_1(T)$ be the function representing the voltage applied across the input terminals 30 and 31 of the derivator, $V_2(T)$ the function representing the voltage across the leads 57 and 58, C the capacitance of the capacitor 59, $r$ the resistance of the resistor 60 and $i(T)$ the current flowing through the capacitor 59. Assume also that the leads 57 and 58 of the derivator have been disconnected from the tube 61 and the battery 62. Consequently, the same current $i(T)$ flows through the capacitance 59 and through the resistance 60 and the following relation holds true:

$$V_1(T) \frac{1}{C} \int_0^T i(T) dT + r i(T) \qquad (9)$$

Differentiating the Equation 9 I obtain $$\frac{dV_1(T)}{dT} = \frac{1}{C} i(T) + r \frac{di(T)}{dT} \qquad (10)$$

By selecting the proper values of the resistance $r$, for example making $r$ negligibly small, the term $$r \frac{di(T)}{dT}$$

can be made negligible as compared to $$\frac{i(T)}{C}$$

and the following relation may hold with an approximation satisfactory for practical purposes:

$$\frac{dV_1(T)}{dT} = \frac{1}{C} i(T) \qquad (11)$$

Multiplying both sides of the Equation 11 by $Cr$ I obtain $$Cr \frac{dV_1(T)}{dT} = r i(T) = V_2(T) \qquad (12)$$

Consequently the expression $ri(T)$ which represents the voltage drop across the resistor 60 across the leads 57 and 58 is substantially proportional to $$\frac{dV_1(T)}{dT}$$

which represents the time derivative of the input voltage across the terminals 30 and 31.

The voltage across the leads 57 and 58 is applied to the grid of a 3 electrode tube 61, the cathode of which is connected to the terminal 58 by means of a biasing battery 62. A suitable B battery 63 and a resistor 64 are connected in the plate circuit. The two terminals of the resistor 64 are connected respectively to the terminals 33 and 34. It is well known that for a suitable choice of the type of the tube 61 and batteries 62 and 63, the plate current is proportional to the grid voltage. As the plate current flows through the resistor 64 it is also proportional to the drop of voltage across this resistor, that is to say the voltage across the terminals 33 and 34.

Consequently the voltage across the output terminals 33 and 34 represents the voltage across the leads 57 and 58 which is suitably amplified As the voltage across the leads 57 and 58 is substantially proportional to the time derivative of the input voltage across the terminals 30 and 31, then the output voltage across the terminals 33 and 34 represents the instantaneous rate of progress of the drilling bit into the formation.

(5) The means for damping the fluctuations of the voltage across the terminals 33 and 34 (within the dotted rectangle 65) without interfering with a sufficiently fast response of the instrument. The means comprises any kind of low-pass filter or simply a capacitor 68 shown on Figure 2.

It is apparent that the means (1) (comprised within the dotted rectangle 19) is not always essential to the satisfactory operation of the instrument. Particularly when the formations drilled are hard and the drilling progress is too slow for the continuous feeding of the hoist line 6, the drilling is effected by the so-called "drilling off" method. While drilling off, the reel 7 does not rotate at all, the hoist line 6 does not move and the progress of the drill bit is determined only from the decrease of the weight on bit. When the weight on bit decreases too much, the driller feeds the hoist line 6 by releasing the brake of the reel 7 and brings the weight on bit to its desirable value. Thereafter, a new drilling off period begins; while drilling off $D_A$ is equal to zero and the formula (8) becomes $$\frac{dD_B}{dT}=\frac{d}{dT}KW_R=K\frac{dW_R}{dT} \quad (13)$$

Thus it is evident that in hard formation areas the means (1) for producing the signal $D_A$ and the means (3) for adding this signal to another one becomes useless. The means (2) for producing the signal $KW_R$, the means (4) for producing the time derivative of $KW_R$, the means (5) for damping the vibrations and the meter 35 are enough to give an instantaneous bit rate of drilling indication. For this reason a simplified instrument comprising only the means (2), (4), (5) and the meter 35 is sufficient in slow drilling areas, but the indication is given only while drilling off and not while feeding the hoist line.

It is apparent that the strain responsive element 42 may be placed in other suitable position. For instance, this element may be located in the hook 14 or below. Such is, for instance, the case in the Byron Jackson electronic weight indicator. The advantage of such an arrangement is to eliminate the error due to the friction in the pulleys 3 and 4.

Means (2) may be designed as shown on Fig. 2a. There are now commercially available weight indicators with a linear scale; that is to say, weight indicators in which equal displacements of the moving arm on different portions of the scale correspond to equal differences of weight. As an example, the Cameron Iron Works weight on bit indicator type E may be quoted.

Referring to Fig. 2a, the numeral 69 designates such a weight indicator hooked on the dead line 8 or elsewhere. The moving part of the weight indicator drives a member 70 of a variable potentiometer; the stationary part of the potentiometer consists of a semi-circular resistor 70 supplied by a suitable battery 72. It is apparent that the voltage output of the potentiometer 71 derived from the terminals 73 and 74 represents the weight $W_R$. This voltage is applied to the variable potentiometer 75, the output of which derived from the terminals 77 and 78 represents $KW_R$ and may be used instead of the voltage across the terminals 23 and 24 of Fig. 2.

Figure 3:
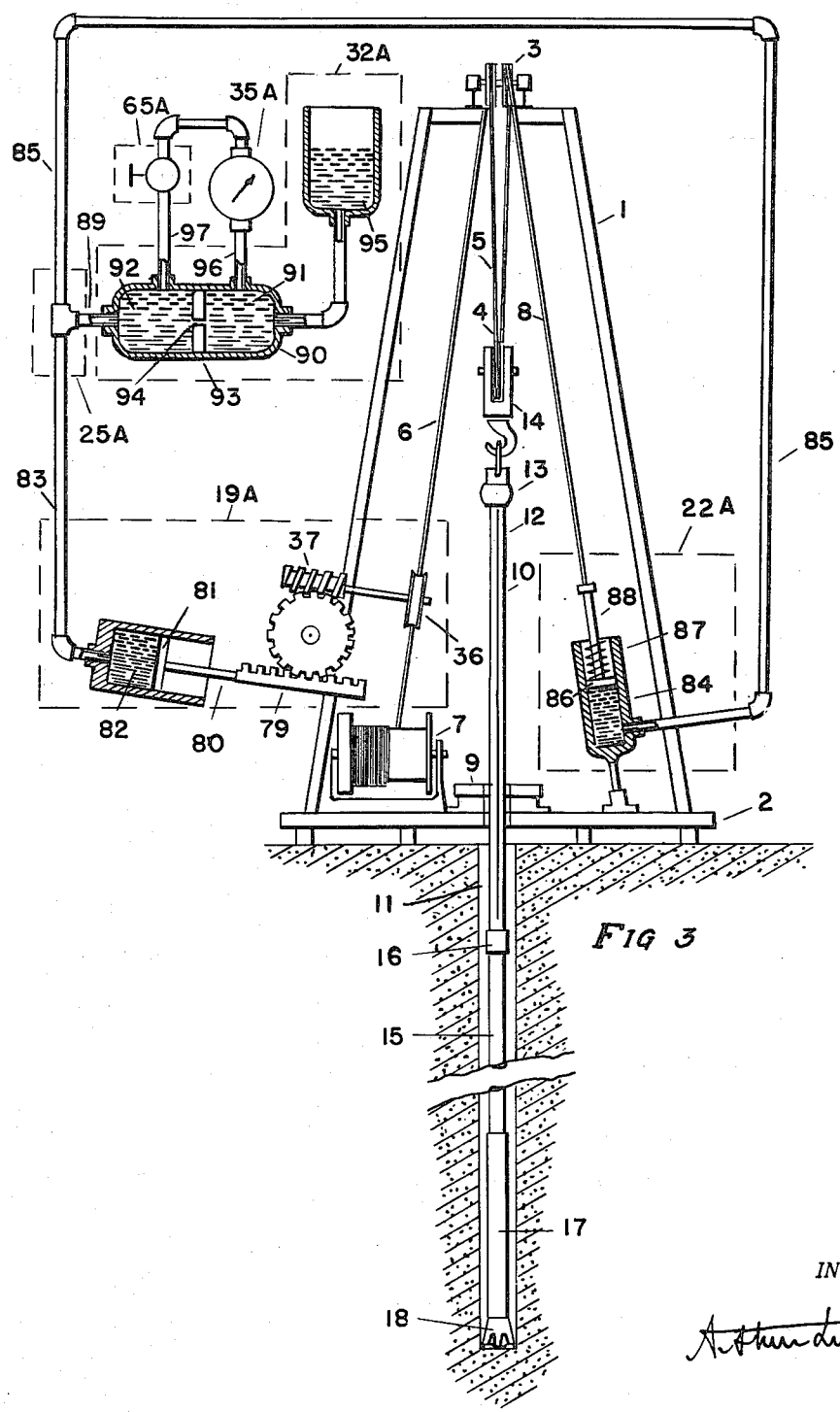
Fig. 3 shows another embodiment of the rate indicating instrument in conjunction with conventional drilling equipment. The instrument is of hydraulic type.

Consider now an arrangement of Fig. 3 showing a rate indicating instrument of hydraulic type. The elements that are common to Figs. 2 and 3 are designated by the same numerals and then the explanation is not deemed necessary. The elements that are similar but of hydraulic instead of electric type are designated by the same numerals to which the letter "A" was added. The instrument comprises similar elements to those of Fig. 2 designated by dotted lines 19A, 22A, 2A, 32A, 65A, and the meter 35A. These elements are as follows:

The means (1) (within the dotted rectangle 19A) comprises the same elements 36 and 37 as the electric type instrument which are respectively a pulley, worm gear, and pinion. The worm gearing 37 drives a rack 79 which moves a rod 80 and a piston 81 within a cylinder 82. Consequently the rotation of the pulley 36 drives the piston 81 in such a manner that the displacement of the piston 81 is proportional to $D_A$. This piston displaces an incompressible fluid out of the cylinder into a pipe 83 in accordance with the variation of $D_A$. Therefore the displacement of the fluid is equivalent to the output voltage across terminals 20 and 21 of Fig. 2.

The means (2) (within the dotted line 22A) comprises a cylinder 84 provided with an outlet pipe 85 and a piston 86 adapted to slide within the cylinder 84 and thus actuate the motion of the liquid between the cylinder and the pipe. A tension spring 87 is placed between the piston and the bottom of the cylinder. The piston 86 drives a rod 88 clamped to the dead line 8, the cylinder itself being anchored to the derrick.

It is apparent that the spring 87 is subjected to the tension proportional to $W_R$ and therefore the length of spring represents the value of $W_R$. On the other hand, this spring controls the position of the piston 86 and consequently controls also the amount of liquid within the cylinder. Therefore the arrangement as shown is adapted to displace the liquid from the cylinder 84 to the pipe 85 in response to the value of $W_R$. Consequently the displacement of the fluid is equivalent to the output voltage across terminals 23 and 24 of the Fig. 2.

The pipes 83 and 85 are interconnected so as to add their outputs into a pipe 89. The connection between the pipes 83 and 85 is included within the dotted rectangle 25A which represents the means (3).

The means (4) comprised within the dotted rectangle 32A is a hydraulic derivator. It consists of a cylinder 90 divided into 2 compartments 91 and 92 separated by a partition 93 provided with a suitable small orifice 94. The compartment 92 is connected to the input pipe 89 and the compartment 91 is connected to a liquid reservoir 95. The tubes 96 and 97 are respectively connected to the compartments 91 and 92 in order to measure the difference of pressure between these two compartments, pressure which is equivalent to the output voltage across terminals 33 and 34 of Fig. 2.

The means (5) (within the dotted rectangle 65A) comprises a variable small orifice for damping purpose.

A suitable meter 35A measuring the damped difference of pressure between the compartments 91 and 92 is equivalent to the meter 35 of Fig. 2.

The principle of operation is as follows: The amount of liquid which flows from the reservoir 95 through the cylinder 90 into the pipe 89 represents $D_A + KW_R$ and consequently the velocity of the liquid represents $$\frac{d}{dT}(D_A + KW_R) \text{ i. e.}$$

the instantaneous rate of progress of the bit into the formation.

The velocity of the liquid is measured by the conventional calibrated orifice 94. The drop of pressure in the orifice is measured by the meter 35A graduated in feet per hour.

It is apparent that in this arrangement as well as in the preceding arrangements, the means (1) and (3) may be eliminated and the indication of the meter 35A will then represent the value $$\frac{dW_R}{dT}$$

corresponding to the instantaneous rate of drilling while drilling off.

Consider now an arrangement of Fig. 4 showing a rate indicating instrument of electrical type in which the use of a derivator circuit as shown in Fig. 2 has been eliminated. The elements that are common to Fig. 2 and Fig. 4 are designated by the same numerals and then the explanation is not deemed necessary. The elements that are to some extent similar are designated by the same numerals to which the letter B was added. Instead of derivating versus time the signal $D_A + KW_R$ according to the formula (8) the signals $$\frac{dD_A}{dT}$$

and $$K\frac{dW_R}{dT}$$

will be directly produced and subsequently added; that is to say that this time the formula (7) will be applied. Consequently, the rate indicating instrument shown on Fig. 4 comprises following essential elements.

(1) Means for producing a signal $$\frac{dD_A}{dT}$$

comprised within the dotted rectangle 19B. An electric voltage representing the value of $$\frac{dD_A}{dT}$$

is thus produced across the output terminals 20B and 21B.

(2) Means for producing a signal $$K\frac{dW_R}{dT}$$

comprised within the dotted line 22B. An electric voltage representing the value of $$K\frac{dW_R}{dT}$$

is thus produced across the output terminals 23B and 24B.

(3) Means for adding the two preceding signals comprised within the dotted rectangle 25. This means is identical to the one described in connection with Fig. 2 and consequently the voltage across the output terminals 30 and 31 represents $$\frac{dD_A}{dT} + K\frac{dW_R}{dT}$$

(4) Means for damping all fluctuations above some frequency, comprised within the rectangle 65. This means is identical to the means (5) described in connection with Fig. 2.

(5) A voltmeter (35) identical to the one described in connection with Fig. 2 graduated in feet per hour and indicating the rate of progress of the bit into the formation.

The means (1) and (2) are described as follows:

The means (1) for producing the signal $$\frac{dD_A}{dT}$$

(within the dotted rectangle 19B) comprises a pulley 36 driven by the hoist line 6, which in turn drives a tachometer-generator 98. The voltage across the output terminals 20B and 21B is proportional to the velocity of the generator which is proportional to $$\frac{dD_A}{dT}$$

therefore the voltage across the output terminals 20B and 21B represent the signal $$\frac{dD_A}{dT}$$

The means (2) for producing the signal $$K\frac{dW_R}{dT}$$

(within the dotted line 22B) comprises any commercially available weight indication 99 with a linear scale and which moving parts are sufficiently powerful to drive the gears and generator which will be described later on. For example, a Byron Jackson Electronic Weight Indicator is perfectly suitable. The weight indicator drives a tachometer-generator 100 through a suitable gear train 101. It is apparent that the voltage across the output terminals 102 and 103 of the generator 100 represents the signal $$\frac{dW_R}{dT}$$

This voltage is applied to the variable potentiometer 104. The voltage across the output terminals 23B and 24B is the output voltage of the potentiometer 104 and represents the signal $$K\frac{dW_R}{dT}$$

Various other alterations and changes may be made in size, form and arrangement of the details of the described apparatus without departing from the scope of the appended claims.

What is claimed and desired to secure by Letters Patent is:

1. A device for producing a signal representing the instantaneous rate of penetration of a drill bit in a rotary drilling rig comprising in combination, means for producing a signal representing the weight on said bit, and a means responsive to said signal for producing an indication representing rate of change of said signal with time, said indication representing the instantaneous rate of penetration of the said drill bit.

2. A device for producing a signal representing the intantaneous rate of penetration of a drill bit in a rotary drilling rig comprising in combination, means for producing a signal representing the weight on said bit and a means responsive to said signal for producing another signal representing substantially the time derivative thereof, said other signal serving as an index of the instantaneous rate of penetration of the said drill bit.

3. Apparatus for indicating the progress of well drilling employing a rotary drilling string having its upper portion above the earth's surface and having a bit attached to its lower portion, comprising a means cooperating with said upper portion for producing a signal representing the motion of said portion, a weight indicator for producing another signal representing the weight on the bit, a derivator responsive to the output of said weight indicator for producing a signal representing the derivative with respect to time of said other signal, and means for combining said first signal and said derivative representing signal for producing a resultant indication representing the motion of the bit.

4. Apparatus for indicating the progress of well drilling employing an elongated rotary drilling string having its upper portion in the neighborhood of the earth's surface and having a bit attached to its lower portion comprising a means cooperating with said upper portion for producing a signal representing the displacement of said portion, means for producing a signal representing the weight on the bit, means for adding said two signals thereby producing a resultant signal and a rate indicator responsive to said last means for producing a resultant indication having magnitude representing the rate of variation of said resultant signal with respect to time.

5. Apparatus for indicating the progress in well drilling by means of rotary drilling string having a bit attached thereto comprising means operated in conjunction with said drilling string and responsive to the operation thereof for producing a signal representing the downward progress of the drilling string, means responsive to the weight on the bit for producing a signal having magnitude representing the rate of change of said weight with respect to time, and means for combining said signals to produce a resultant signal representing the progress of the well drilling.

6. A device for producing a signal representing the instantaneous rate of penetration of a drill bit in a rotary drilling rig comprising in combination, means for producing an electrical signal representing the weight on said bit, and an electrical network responsive to said signal for producing another signal representing substantially the time derivative thereof, said other signal serving as an index of the instantaneous rate of penetration of the said drill bit.

7. Apparatus for indicating the progress of well drilling employing an elongated rotary drilling string having its upper portion above the earth's surface and having a bit attached to its lower portion, comprising a means cooperating with said upper portion for producing an electrical current representing the motion of said portion, means for producing an electrical signal representing the weight on the bit, an electrical network responsive to said signal for producing another electrical current representing substantially the time derivative of said signal and means for combining said two currents for producing a resultant indication representing the motion of the bit.

References Cited in the file of this patent

UNITED STATES PATENTS

| Number | Name | Date |
|---|---|---|
| 1,925,012 | Taylor | Aug. 29, 1933 |
| 1,967,111 | Black | July 17, 1934 |
| 2,357,051 | McLaine | Aug. 29, 1944 |
| 2,365,014 | Silverman et al. | Dec. 12, 1944 |
| 2,390,178 | Rutherford | Dec. 4, 1945 |
| 2,419,120 | Clark | Apr. 15, 1947 |
| 2,455,917 | Croke | Dec. 14, 1948 |
| 2,539,758 | Silverman et al. | Jan. 30, 1951 |